US010581708B2

(12) United States Patent
Wu et al.

(10) Patent No.: US 10,581,708 B2
(45) Date of Patent: Mar. 3, 2020

(54) WEBSITE MONITORING METHOD AND DEVICE

(71) Applicant: BEIJING BAIDU NETCOM SCIENCE AND TECHNOLOGY CO., LTD., Beijing (CN)

(72) Inventors: Changwei Wu, Beijing (CN); Yuelong Sun, Beijing (CN)

(*) Notice: Subject to any disclaimer, the term of this patent is extended or adjusted under 35 U.S.C. 154(b) by 465 days.

(21) Appl. No.: 15/280,418

(22) Filed: Sep. 29, 2016

(65) Prior Publication Data
US 2017/0353371 A1 Dec. 7, 2017

(30) Foreign Application Priority Data

Jun. 1, 2016 (CN) .......................... 2016 1 0380147

(51) Int. Cl.
*G06F 15/16* (2006.01)
*H04L 12/26* (2006.01)
(Continued)

(52) U.S. Cl.
CPC ............ *H04L 43/0805* (2013.01); *G06F 9/46* (2013.01); *G06F 16/00* (2019.01);
(Continued)

(58) Field of Classification Search
CPC ....... H04L 67/22; H04L 67/1023; G06F 9/00; G06F 17/30
(Continued)

(56) References Cited

U.S. PATENT DOCUMENTS 7,792,948 B2 * 9/2010 Zhao ..................... H04L 41/046
709/224
2002/0198985 A1 * 12/2002 Fraenkel ............. G06F 11/3409
709/224
(Continued)

FOREIGN PATENT DOCUMENTS

| CN | 103391206 A | 11/2013 |
|---|---|---|
| CN | 10365575 A | 3/2014 |
| CN | 104615497 A | 5/2015 |

*Primary Examiner* — David R Lazaro
*Assistant Examiner* — Mariegeorges A Henry
(74) *Attorney, Agent, or Firm* — Seed IP Law Group LLP

(57) ABSTRACT

The present application discloses a website monitoring method and device. A specific embodiment of the method comprises the following steps: receiving monitoring information of websites to be monitored from the allocation server, the monitoring information transmitted to the plurality of monitoring servers after the allocation server parses a website monitoring request for the websites to be monitored transmitted from the terminal, and the monitoring information comprising monitoring cycles and monitoring types; allocating, according to a preset allocation algorithm, different monitoring execution times for the websites to be monitored; determining priorities of the websites to be monitored based on lengths of the monitoring cycles; and selecting, based on the priorities, a worker thread from a pre-created thread pool to allow the selected worker thread to periodically monitor the websites to be monitored at the monitoring execution times. According to the embodiment, inherent resources of each monitoring server are sufficiently utilized and the failure rate and the error rate of website monitoring are reduced.

19 Claims, 6 Drawing Sheets

(51) Int. Cl.
  *H04L 29/08* (2006.01)
  *G06F 9/46* (2006.01)
  *G06F 16/00* (2019.01)
(52) U.S. Cl.
  CPC .......... *H04L 43/0852* (2013.01); *H04L 43/16* (2013.01); *H04L 67/02* (2013.01); *H04L 67/1023* (2013.01); *H04L 67/22* (2013.01)
(58) Field of Classification Search
  USPC ........................................ 709/203, 223, 224
  See application file for complete search history.

(56) References Cited

U.S. PATENT DOCUMENTS

| | | | | |
|---|---|---|---|---|
| 2007/0266148 | A1* | 11/2007 | Ruiz .................. | H04L 41/5038 709/224 |
| 2007/0300230 | A1* | 12/2007 | Barsness ............... | G06F 9/4881 718/103 |
| 2010/0058366 | A1* | 3/2010 | Swildens ............ | G06F 11/3414 719/329 |
| 2013/0007753 | A1* | 1/2013 | Jain .......................... | G06F 9/46 718/103 |
| 2014/0373021 | A1* | 12/2014 | Teixeira ................ | G06F 9/5038 718/103 |
| 2016/0182286 | A1* | 6/2016 | Lunden ................ | H04W 24/02 370/254 |
| 2016/0357248 | A1* | 12/2016 | Lingutla ............... | G06F 1/3206 |

* cited by examiner

WEBSITE MONITORING METHOD AND DEVICE

CROSS REFERENCE TO RELATED APPLICATION

This application claims the priority of Chinese Patent Application No. 201610380147.7, entitled "Website Monitoring Method and Device," filed on Jun. 1, 2016, the content of which is incorporated herein by reference in its entirety.

FIELD OF THE INVENTION

The present invention relates to the field of computer technology, particularly to the field of Internet technology, and more particularly to a website monitoring method and device.

BACKGROUND OF THE INVENTION

With the explosive growth of Internet data, monitoring website availability on the Internet has attracted more and more attention. The webmasters are increasingly attentive to, for instance, failures of the website services, congestions at the gateways to the Internet data center (IDC), and the connectivity, speed and quality to access the website from different parts of the country and through different service providers. The connectivity and the access quality of the websites may be detected by monitoring servers deployed throughout the country, but are limited by the computing capacity, storage capacity and bandwidth of each monitoring server. In the event that the maximum load of each monitoring server is exceeded, the accuracy of activating website monitoring will decrease, thus resulting in monitoring failure, monitoring errors or other phenomena.

SUMMARY

An objective of the present application is to provide a website monitoring method and device, in order to solve the technical problem mentioned in the foregoing Background section.

In a first aspect, the present application provides a website monitoring method, which comprises: transmitting, by a terminal, a request to an allocation server; parsing, by the allocation server, the request transmitted from the terminal to obtain information corresponding to the request; transmitting the parsed information to a plurality of monitoring servers; receiving, by the monitoring server, monitoring information of websites to be monitored from the allocation server, the monitoring information transmitted to the plurality of monitoring servers after the allocation server parses a website monitoring request for the websites to be monitored transmitted from the terminal, and the monitoring information comprising monitoring cycles and monitoring types; allocating, according to a preset allocation algorithm, different monitoring execution times for the websites to be monitored; determining priorities of the websites to be monitored based on lengths of the monitoring cycles; and selecting, based on the priorities, a worker thread from a pre-created thread pool to allow the selected worker thread to periodically monitor the websites to be monitored at the monitoring execution times.

In some embodiments, allocating, according to the preset allocation algorithm, different monitoring execution times for the websites to be monitored includes: judging whether the websites to be monitored need to be synchronously monitored on the plurality of monitoring servers based on the monitoring types of the websites to be monitored; and selecting, using a randomized algorithm, different times uniformly within the monitoring cycles as the monitoring execution times for the websites to be monitored, in response to no need to synchronously monitor each of the websites to be monitored on the plurality of monitoring servers.

In some embodiments, allocating, according to the preset allocation algorithm, different monitoring execution times for the websites to be monitored further includes: selecting, using a Hash algorithm, different fixed times within the monitoring cycles as the monitoring execution times for the websites to be monitored, in response to a need to synchronously monitor each of the websites to be monitored on the plurality of monitoring servers.

In some embodiments, determining the priorities of the websites to be monitored based on the lengths of the monitoring cycles further includes: selecting, using a Hash algorithm, different fixed times within the monitoring cycles as the monitoring execution times for the websites to be monitored, in response to a need to synchronously monitor each of the websites to be monitored on the plurality of monitoring servers.

In some embodiments, determining the priorities of the websites to be monitored based on the lengths of the monitoring cycles includes: determining an order from high to low of the priorities of the websites to be monitored based on an order from short to long of the monitoring cycles, when the monitoring cycles of the websites to be monitored are not identical.

In some embodiments, determining the priorities of the websites to be monitored based on the lengths of the monitoring cycles includes: determining a tolerable delay time for each of the website to be monitored when the monitoring cycles of the websites to be monitored are identical; and determining the order from high to low of the priorities of the websites to be monitored based on an order from short to long of the tolerable delay times.

In some embodiments, selecting, based on the priorities, the worker thread from the pre-created thread pool to allow the selected worker thread to periodically monitor the websites to be monitored at the monitoring execution times includes: adding the websites to be monitored to a predetermined buffering queue based on an order from high to low of the priorities; selecting the worker thread from the pre-created thread pool to allow the selected worker thread to sequentially select the websites to be monitored from the predetermined buffering queue for monitoring; and stopping adding the websites to be monitored to the predetermined buffering queue, when the predetermined buffering queue is full.

In some embodiments, selecting, based on the priorities, the worker thread from the pre-created thread pool to allow the selected worker thread to periodically monitor the websites to be monitored at the monitoring execution times includes: counting a number of websites currently monitored by each worker thread in the pre-created thread pool; and selecting, based on an order from high to low of the priorities, worker threads having a minimum number of websites currently monitored sequentially to allow the selected worker threads to periodically monitor the websites to be monitored at the monitoring execution times.

In some embodiments, the method further comprises, prior to selecting, based on the priorities, the worker thread from the pre-created thread pool to allow the selected worker thread to periodically monitor the websites to be monitored at the monitoring execution times: registering a timer to calibrate the monitoring execution times for the websites to be monitored.

In some embodiments, the method further comprises: stopping monitoring a website specified by monitoring stop information in response to receiving the monitoring stop information from the allocation server, the monitoring stop information transmitted to the monitoring server when the allocation server receives the monitoring stop request transmitted from the terminal; and generating a monitoring result and returning the monitoring result to the allocation server.

In a second aspect, the present application provides a website monitoring device, wherein a terminal transmits a request to an allocation server, and the allocation server parses the request transmitted from the terminal to obtain information corresponding to the request and transmits the parsed information to a plurality of monitoring servers, and the device comprises: a receiving unit for receiving monitoring information of websites to be monitored from the allocation server, the monitoring information transmitted to the plurality of monitoring servers after the allocation server parses a website monitoring request for the websites to be monitored transmitted from the terminal, and the monitoring information comprising monitoring cycles and monitoring types; an allocation unit for allocating, according to a preset allocation algorithm, different monitoring execution times for the websites to be monitored; a determination unit for determining priorities of the websites to be monitored based on lengths of the monitoring cycles; and a monitoring unit for selecting, based on the priorities, a worker thread from a pre-created thread pool to allow the selected worker thread to periodically monitor the websites to be monitored at the monitoring execution times.

In some embodiments, the allocation unit comprises: a judgment module for judging whether the websites to be monitored need to be synchronously monitored on the plurality of monitoring servers based on the monitoring types of the websites to be monitored; and a first allocation module for selecting, using a randomized algorithm, different times uniformly within the monitoring cycles as the monitoring execution times for the websites to be monitored, in response to no need to synchronously monitor each of the websites to be monitored on the plurality of monitoring servers.

In some embodiment, the allocation unit further comprises: a second allocation module for selecting, using a Hash algorithm, different fixed times within the monitoring cycles as the monitoring execution times for the websites to be monitored, in response to a need to synchronously monitor each of the websites to be monitored on the plurality of monitoring servers.

In some embodiments, the determination unit comprises: a first determination module for determining an order from high to low of the priorities of the websites to be monitored based on an order from short to long of the monitoring cycles, when the monitoring cycles of the websites to be monitored are not identical.

In some embodiments, the determination unit further comprises: a second determination module for determining a tolerable delay time for each of the website to be monitored when the monitoring cycles of the websites to be monitored are identical; and a third determination module for determining the order from high to low of the priorities of the websites to be monitored based on an order from short to long of the tolerable delay times.

In some embodiments, the monitoring unit comprises: an adding module for adding the websites to be monitored to a predetermined buffering queue based on an order from high to low of the priorities; a first selection module for selecting the worker thread from the pre-created thread pool to allow the selected worker thread to sequentially select the websites to be monitored from the predetermined buffering queue for monitoring; and an adding stopping module for stopping adding the websites to be monitored to the predetermined buffering queue, when the predetermined buffering queue is full.

In some embodiments, the monitoring unit comprises: a counting module for counting a number of websites currently monitored by each worker thread in the pre-created thread pool; and a second selection module for selecting, based on an order from high to low of the priorities, worker threads having a minimum number of websites currently monitored sequentially to allow the selected worker threads to periodically monitor the websites to be monitored at the monitoring execution times.

In some embodiments, the device further comprises: a calibration unit for registering a timer to calibrate the monitoring execution times for the websites to be monitored prior to selecting, based on the priorities, the worker thread from the pre-created thread pool to allow the selected worker thread to periodically monitor the websites to be monitored at the monitoring execution times.

In some embodiments, the device further comprises: a monitoring stopping unit for stopping monitoring a website specified by monitoring stop information in response to receiving the monitoring stop information from the allocation server, the monitoring stop information transmitted to the monitoring server when the allocation server receives the monitoring stop request transmitted from the terminal; and a result return unit for generating a monitoring result and returning the monitoring result to the allocation server.

According to the website monitoring method and device provided by the present application, by allocating different monitoring execution times for the websites to be monitored, determining the priorities of the websites to be monitored according to the lengths of the monitoring cycles for the websites to be monitored, and allocating the worker thread for the websites to be monitored according to the priorities, the selected worker thread can periodically monitor the websites to be monitored at the monitoring execution times. Therefore, inherent resources of each monitoring server are sufficiently utilized and the failure rate and error rate of website monitoring are reduced.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
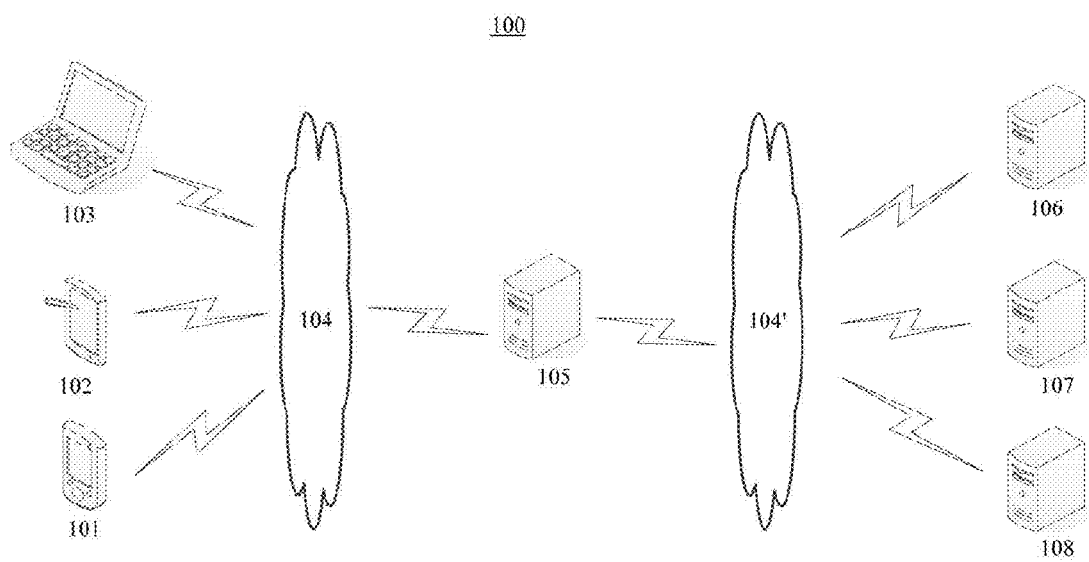
FIG. 1 is an architectural diagram of an exemplary system in which the present application may be implemented.

FIG. 1 shows an architectural diagram of an exemplary system 100 of in which a website monitoring method or device of an embodiment of the present application may be implemented.

As illustrated in FIG. 1, the system architecture 100 may include terminal devices 101, 102 and 103, a network 104, an allocation server 105 and monitoring servers 106, 107 and 108. The networks 104 and 104' serves as a medium providing a medium for a communication link between the terminal devices 101, 102 and 103 and the allocation server 105, as well as between the allocation server 105 and the monitoring servers 106, 107 and 108. The networks 104 and 104' may include various types of connections, such as wired or wireless transmission links, or optical fibers.

The user may use the terminal devices 101, 102 and 103 to interact with the allocation server 105 through the network 104, and the allocation server 105 may interact with the monitoring servers 106, 107 and 108 through the network 104, in order to transmit or receive messages, etc. Various communication client applications, such as webpage browsing application, etc. may be installed on the terminal devices 101, 102 and 103.

The terminal devices 101, 102 and 103 may be various electronic devices having display screens and supporting web browsing, including but not limited to, smart phones, tablet personal computers, e-book readers, laptop computers, and desk computers.

The allocation server 105 may be a server providing various services, e.g., a backend server which provides support for a request transmitted from the terminal devices 101, 102 and 103. The backend server may parse received data, such as a website monitoring request, and feed back a processing result (e.g., a website monitoring result) to the terminal devices.

The monitoring servers 106, 107 and 108 may be servers providing various services, e.g., backend servers for processing information transmitted from the allocation server 105. The backend servers may monitor the received information and feed back a monitoring result to the allocation server 105.

It should be noted that the website monitoring method provided by the embodiment of the present application is generally executed by the monitoring servers 106, 107 and 108, and accordingly, a website monitoring device is generally installed in the monitoring servers 106, 107 and 108.

It should be appreciated that the numbers of the terminal devices, the networks, the allocation servers and the monitoring servers in FIG. 1 is merely illustrative. Any number of terminal devices, networks, allocation servers and monitoring servers may be provided based on the actual requirements.

Figure 2:
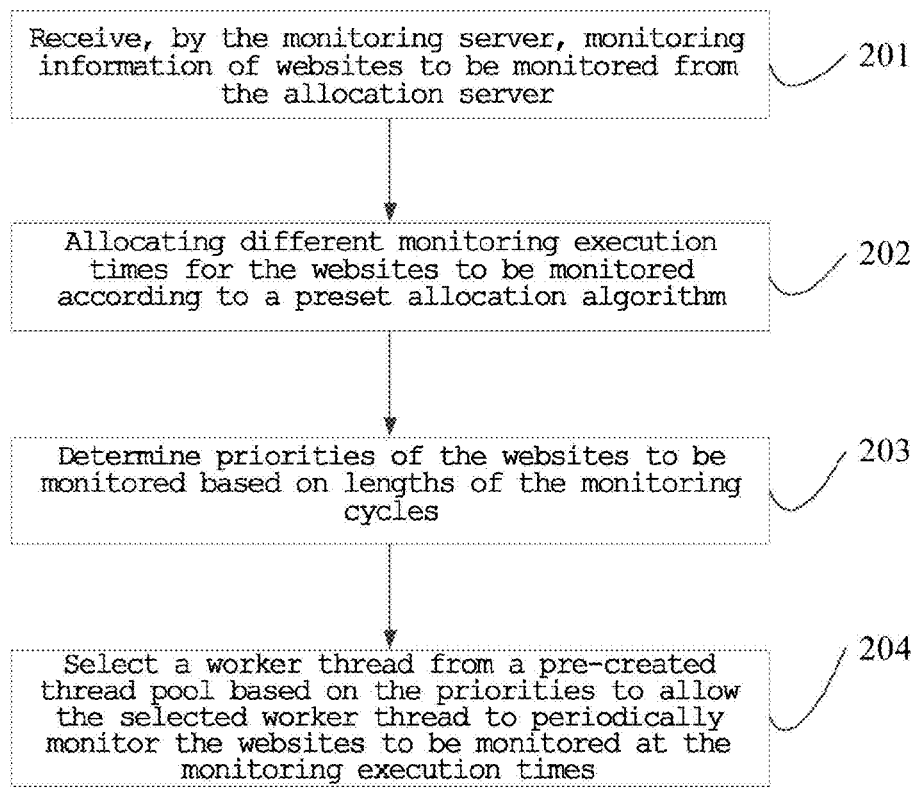
FIG. 2 is a flowchart of a website monitoring method according to one embodiment of the present application.

With further reference to FIG. 2, a flow 200 of a website monitoring method according to an embodiment of the present application is illustrated. The website monitoring method of this embodiment comprises the following steps:

Step 201: Receive, by the monitoring server, monitoring information of websites to be monitored from the allocation server.

In this embodiment, an electronic device (e.g., the monitoring server as illustrated in FIG. 1) on which the website monitoring method operate may receive the monitoring information of the websites to be monitored from the allocation server through a wired or wireless connection. It should be noted that the above mentioned wireless connection may include, but is not limited to, 3G/4G connection, WiFi connection, Bluetooth connection, WiMAX connection, Zigbee connection, UWB (ultra wideband) connection, and other known or future developed wireless connection method.

The monitoring servers are distributed throughout the country and used to monitor websites. The allocation server is used to receive a website monitoring request, which is transmitted from a terminal, for websites to be monitored, parse the website monitoring request to obtain monitoring information of the websites to be monitored, and then transmit the monitoring information to a plurality of monitoring servers to monitor the websites to be monitored. It should be understood that the monitoring information includes: a monitoring cycle, a monitoring type, etc.

Step 202: Allocating different monitoring execution times for the websites to be monitored according to a preset allocation algorithm.

Because the monitoring on the websites to be monitored is executed periodically, and each website to be monitored has no special requirement on the monitoring execution time within the monitoring cycle, the monitoring execution times of different websites to be monitored may be uniformly distributed within the monitoring cycles.

Step 203: Determine priorities of the websites to be monitored based on lengths of the monitoring cycles.

Different websites to be monitored require different lengths of the monitoring cycles. For the website to be monitored that requires a relatively long monitoring cycle, only a time point needs to be selected within the monitoring cycle during the selection of the monitoring execution time, so that the monitoring execution time for such website to be monitored has greater selectivity. Therefore, the priorities of the websites to be monitored are determined based on the lengths of the monitoring cycles.

Step 204: Select a worker thread from a pre-created thread pool based on the priorities to allow the selected worker thread to periodically monitor the websites to be monitored at the monitoring execution times.

The thread pool includes a plurality of worker threads to process various requests. By adopting the thread pool technology, the time for creating a new worker thread and the time for destroying a worker thread may be effectively shortened, and thereby the throughput capacity of the server can be effectively improved. The worker threads in the thread pool preferentially monitor the website to be monitored with a higher priority, i.e., periodically monitor the websites to be monitored at the monitoring execution times.

According to the website monitoring method provided by the embodiment of the present application, by allocating different monitoring execution times for the websites to be monitored, determining the priorities of the websites to be monitored according to the lengths of the monitoring cycles for the websites to be monitored, and allocating the worker thread for the websites to be monitored according to the priorities, the selected worker thread can periodically monitor the websites to be monitored at the monitoring execution times. Therefore, inherent resources of each monitoring server are sufficiently utilized and the failure rate and error rate of website monitoring are reduced.

Figure 3:
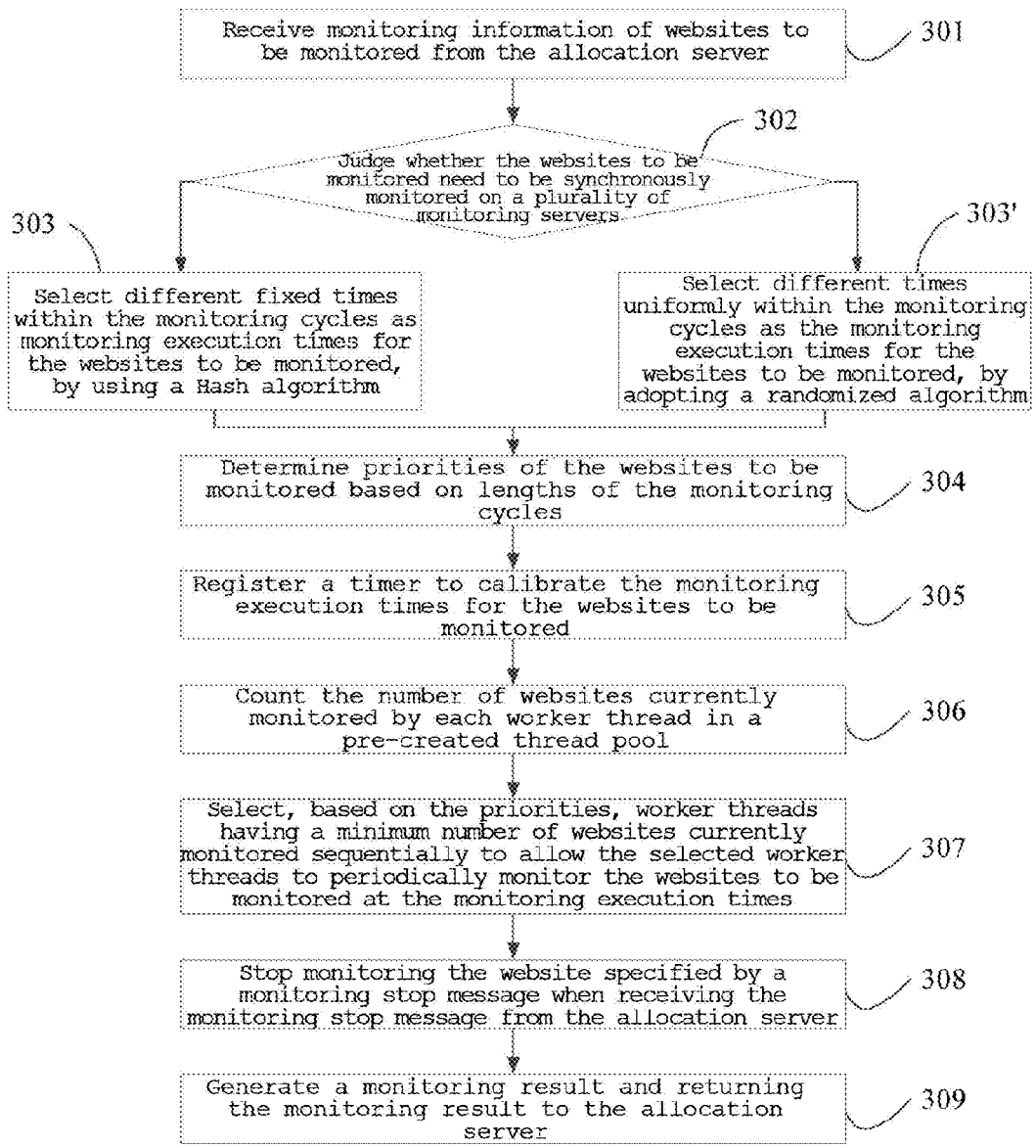
FIG. 3 is a flowchart of a website monitoring method according to another embodiment of the present application.

Further referring to FIG. 3, a flow 300 of a website monitoring method according to another embodiment of the present application is illustrated. The website monitoring method of the embodiment comprises the following steps:

Step 301: Receive monitoring information of websites to be monitored from the allocation server.

The above mentioned monitoring information is obtained after the allocation server receives and parses a website monitoring request transmitted from the terminal. The allocation server transmits the parsed monitoring information to each monitoring server. It should be understood that the above mentioned monitoring information may further comprise an area where the monitoring server required for website monitoring is located, and in this case, the allocation server may transmit the parsed monitoring information to each monitoring server in the above mentioned area.

Step 302: Judge whether the websites to be monitored need to be synchronously monitored on a plurality of monitoring servers.

When the website to be monitored needs to be synchronously monitored on a plurality of monitoring servers, a fixed time within the monitoring cycle is selected to monitor the website to be monitored. For example, when the monitoring cycle is 10 minutes, it is selected to execute the monitoring on the website to be monitored at the second minute of each monitoring cycle. Here, the start times of the monitoring cycles of all the monitoring servers are identical. Alternatively, a fixed time is selected for implementation. For example, if 8:00 on May 1, 2016 is selected as the first monitoring execution time and the monitoring cycle is still 10 minutes, the next monitoring execution time is 8:10 on May 1, 2016.

When the websites to be monitored need to be synchronously monitored on a plurality of monitoring servers, step 303 is executed. When the websites to be monitored do not need to be synchronously monitored on a plurality of monitoring servers, step 303' is executed.

Step 303: Select different fixed times within the monitoring cycles as monitoring execution times for the websites to be monitored, by using a Hash algorithm.

The Hash algorithm can map a binary value of any length into a binary value of a shorter fixed length, and this smaller binary value is referred to as a Hash value. The Hash value is a unique and very compact numerical representation of a piece of data.

In practice, a task label which may be a character string may be assigned to each website to be monitored. A Hash value of the task label of each website to be monitored is obtained, and the monitoring execution time of each website to be monitored within the monitoring cycle is determined based on the Hash value. MD5, SHA1 or MurmurHash may be selected as an implementation of the Hash algorithm. Specifically, MD5 (Message-Digest Algorithm 5) is a hash function which is widely used in the field of computer security and used to provide integrity protection for messages. SHA1 (Secure Hash Algorithm 1) is an algorithm which is capable of calculating a character string (also referred to as message digest) which corresponds to one piece of digital information and has a fixed length. MurmurHash is a function for generating various Hash data rapidly and reliably.

Step 303': Select different times uniformly within the monitoring cycles as the monitoring execution times for the websites to be monitored, by adopting a randomized algorithm.

The randomized algorithm is an algorithm which itself includes a random number generator. By adopting the randomized algorithm, different times may be selected within the monitoring cycles as the monitoring execution times for the websites to be monitored. When the number of the websites to be monitored is large enough, it can be basically realized that the monitoring execution times for the websites to be monitored are uniformly distributed within the monitoring cycles.

Step 304: Determine priorities of the websites to be monitored based on lengths of the monitoring cycles.

Different websites to be monitored require different lengths of the monitoring cycles. For the website to be monitored that requires a relatively long monitoring cycle, only a time point needs to be selected within the monitoring cycle during the selection of the monitoring execution time, so that the monitoring execution time for such website to be monitored has a greater selectivity. Therefore, the priorities of the websites to be monitored are determined based on the lengths of the monitoring cycles.

In some optional implementations of this embodiment, step 304 further comprises the following substep (not illustrated in FIG. 3):
determining an order from high to low of the priorities of the websites to be monitored based on an order from short to long of the monitoring cycles, when the monitoring cycles of the websites to be monitored are not identical.

In some optional implementations of this embodiment, step 304 further comprises the following substeps (not illustrated in FIG. 3):
determining a tolerable delay time for each website to be monitored when the monitoring cycles of the websites to be monitored are identical; and determining the order from high to low of the priorities of the websites to be monitored based on an order from short to long of the tolerable delay times.

In this embodiment, it is appreciated that the monitoring on each website to be monitored is performed at the monitoring execution time. The actual monitoring execution time will be shifted significantly from the calculated monitoring execution time after multiple monitoring because there is a certain delay in the system clock in implementation due to clock callback. However, for the website to be monitored that has a longer cycle, owing to its longer monitoring cycle, the website can accept a longer delay time. In this embodiment, the delay time which can be accepted by the website to be monitored is referred to as a tolerable delay time for the website to be monitored.

When the monitoring cycles for the websites to be monitored are not identical, the priority of each website to be monitored may be determined directly based on the monitoring cycle. When the monitoring cycles for the websites to be monitored are identical, the tolerable delay times for the websites to be monitored are also different owing to different monitoring types of the websites to be monitored. For example, some monitoring which refers to user interface waiting times also has a very short tolerable delay time. Therefore, the order from high to low of the priorities of the websites to be monitored may be determined based on the order from short to long of the tolerable delay times.

Step 305: Register a timer to calibrate the monitoring execution times for the websites to be monitored.

When the monitoring server has a relatively high load, the existing timer will be generally later than a desired monitoring execution time. For example, when the desired monitoring execution time is 00:00:00, the existing timer will implement monitoring at 00:00:001, i.e., the monitoring is delayed for 1 millisecond compared with the monitoring execution time. To avoid such delay, the timer is registered in the system before every execution of monitoring in order to realize the monitoring on the website to be monitored at the desired monitoring execution time.

Step 306: Count the number of websites currently monitored by each worker thread in a pre-created thread pool.

To avoid tasks of monitoring the websites to be monitored from accumulating on one worker thread, the load balance among the worker threads needs to be considered when allocating the worker threads. In this embodiment, appropriate worker threads may be selected based on the number of websites currently monitored by each worker thread. Therefore, the number of websites currently monitored by each worker thread in the thread pool is counted, and the websites are managed according to a "least-task-first" strategy.

In some optional implementations of this embodiment, step 306 further comprises the following substeps (not illustrated in FIG. 3):
adding the websites to be monitored to a predetermined buffering queue based on an order from high to low of the priorities; selecting a worker thread from the pre-created thread pool to allow the selected worker thread to sequentially select the websites to be monitored from the predetermined buffering queue for monitoring; and when the predetermined buffering queue is full, stopping adding the websites to be monitored to the predetermined buffering queue.

When a larger number of websites to be monitored are present, a buffering queue may be set to buffer the monitoring task corresponding to each website to be monitored. When the monitoring task corresponding to each website to be monitored is added to the buffering queue based on an order from high to low of the priorities, the website to be monitored that has the highest priority is listed at the head of the buffering queue. It should be understood that the predetermined buffering queue has a certain length. Worker threads are selected in sequence for the websites to be monitored to allow the selected worker threads to sequentially select the websites to be monitored from the predetermined buffering queue for monitoring. In consideration of extreme conditions that a large number of monitoring tasks corresponding to the websites to be monitored congest, adding the website to be monitored to the predetermined buffering queue is stopped when the predetermined buffering queue is full, to protect the monitoring server and avoid out of memory (OOM).

Step 307: Select, based on an order from high to low of the priorities, worker threads having a minimum number of websites currently monitored sequentially to allow the selected worker threads to periodically monitor the websites to be monitored at the monitoring execution times.

After the number of websites currently monitored by each worker thread is counted, the worker threads monitoring a minimum number of websites are selected in sequence to monitor the websites to be monitored that have larger priorities. These worker thread will periodically monitor the websites to be monitored at the monitoring execution times.

In practice, a managing thread may be set to manage the monitoring tasks corresponding to the websites to be monitored. When the worker threads are not fully loaded, the monitoring tasks corresponding to the websites to be monitored is picked up from the predetermined buffering queue, and then allocated to the worker threads according to the least-task-first strategy. When the predetermined buffering queue is empty or each worker thread is fully loaded, the managing thread is at a standby state.

In practice, the monitoring server may employ a libevent library which is a network library based on event triggering. One or more event_base structures needs to be allocated prior to using libevent. Each event_base structure is regarded as an event, and each worker thread possesses one event_base structure, and only operates its own event_base. Each worker thread possesses one work queue, and when the website to be monitored is allocated to this worker thread, the website to be monitored is added to the work queue to activate the worker thread. Asynchronous communication is executed among all the worker threads.

Step 308: Stop monitoring the website specified by a monitoring stop message when receiving the monitoring stop message from the allocation server.

When the user does not need to monitor the website, a monitoring stop request is transmitted to the allocation server. After receiving the monitoring stop request, the allocation server transmits a monitoring stop message to the corresponding monitoring server. When receiving the monitoring stop message from the allocation server, the monitoring server stops monitoring the website specified by the monitoring stop message.

Step 309: Generate a monitoring result and returning the monitoring result to the allocation server.

After stopping monitoring the website specified by the above mentioned monitoring stop message, the monitoring server generates a monitoring result and return the above mentioned monitoring result to the allocation server. The above mentioned monitoring result may include: packet loss rate, delay and download speed, and other parameters of the monitored website.

According to the website monitoring method provided by the above embodiments of the present application, limited resources of the monitoring server are furthest utilized on the premise of ensuring that the monitoring result of the website to be monitored is correct, such that as many websites to be monitored as possible may be monitored and the usage efficiency of resources is improved.

Figure 4:
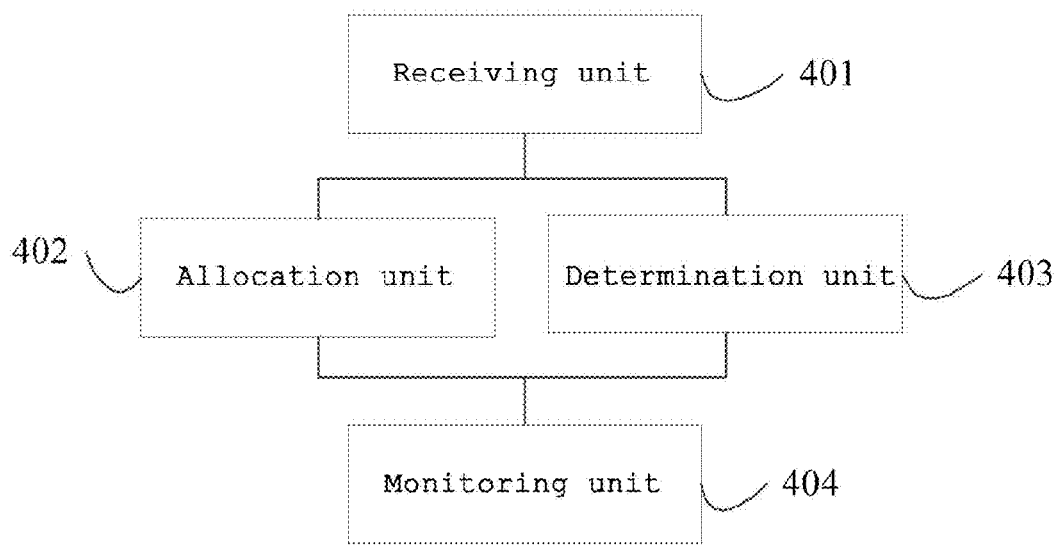
FIG. 4 is a schematic structural diagram of a website monitoring device according to one embodiment of the present application.

With further reference to FIG. 4, a schematic structural diagram 400 of the website monitoring device according to one embodiment of the present application is illustrated. In this embodiment, a terminal transmits a request to an allocation server, and the allocation server parses the request transmitted from the terminal to obtain information corresponding to the request and transmits the parsed information to a plurality of monitoring servers. The website monitoring device of this embodiment comprises a receiving unit 401, an allocation unit 402, a determination unit 403 and a monitoring unit 404.

The receiving unit 401 is used for receiving monitoring information of websites to be monitored from the allocation server.

It should be understood that the monitoring information is transmitted to the plurality of monitoring servers after the allocation server parses a website monitoring request, which is transmitted from the terminal, for the websites to be monitored, and the monitoring information includes monitoring cycles and monitoring types;

The allocation unit 402 is used for allocating, according to a preset allocation algorithm, different monitoring execution times for the websites to be monitored, which correspond to the monitoring information received by the receiving unit 401.

The determination unit 403 is used for determining priorities of the websites to be monitored, which corresponds to the monitoring information received by the receiving unit 401, based on lengths of the monitoring cycles.

The monitoring unit 404 is used for selecting, based on the priorities which are determined by the determination unit 403, a worker thread from a pre-created thread pool to allow the selected worker thread to periodically monitor the websites to be monitored at the monitoring execution times which are determined by the allocation unit 402.

With the website monitoring device provided by the embodiment of the present application, by allocating different monitoring execution times for the websites to be monitored, determining priorities of the websites to be monitored based on lengths of the monitoring cycles of the websites to be monitored, and allocating worker threads for the websites to be monitored based on the priorities, the selected worker thread can periodically monitor the websites to be monitored at the monitoring execution times. Therefore, inherent resources of each monitoring server are sufficiently utilized and the failure rate and error rate of website monitoring are reduced.

Figure 5:
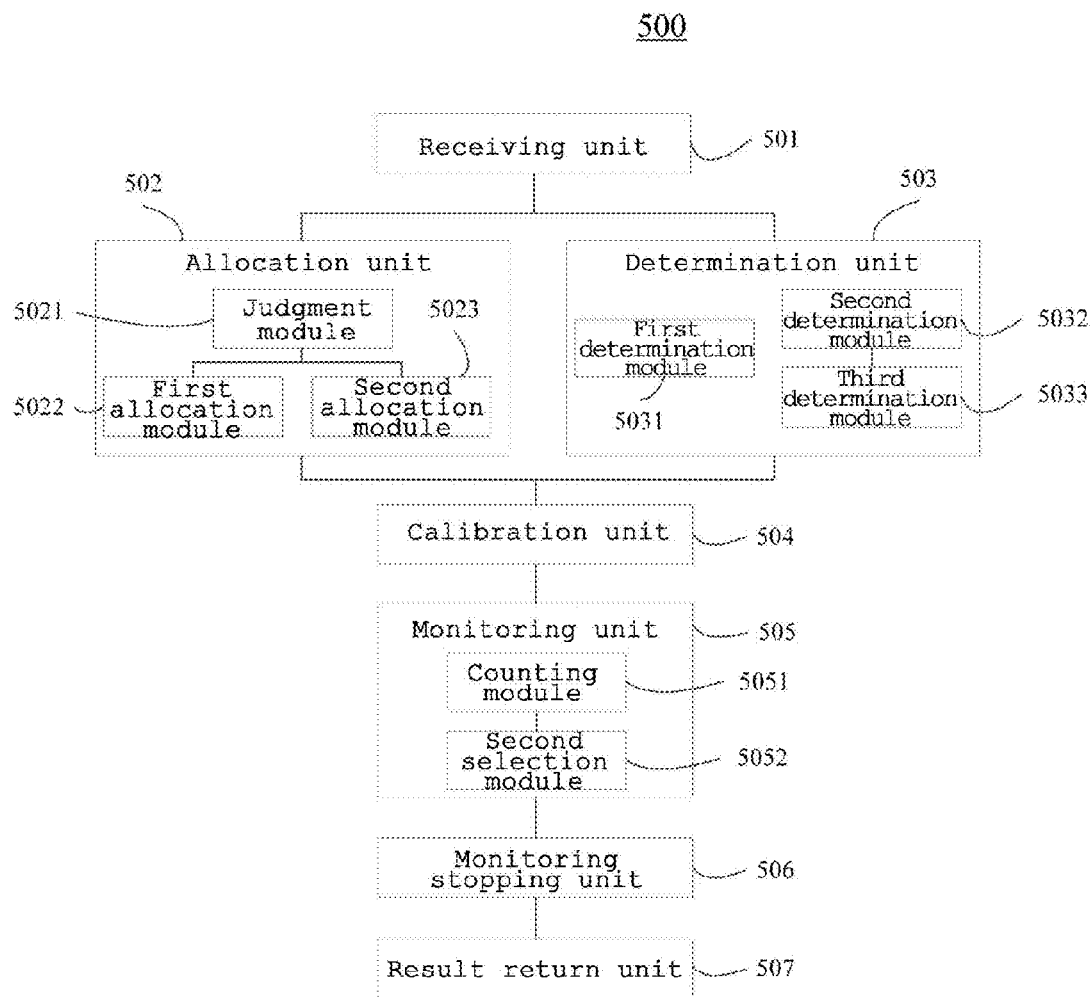
FIG. 5 is a schematic structural diagram of the website monitoring device according to another embodiment of the present application.

With continued reference to FIG. 5, a schematic structural drawing 500 of the website monitoring device according to another embodiment of the present application is illustrated. The website monitoring device of this embodiment comprises a receiving unit 501, an allocation unit 502, a determination unit 503, a calibration unit 504, a monitoring unit 505, a monitoring stopping unit 506 and a result return unit 507.

The receiving unit 501 is used for receiving monitoring information of websites to be monitored from the allocation server.

The monitoring information is transmitted to the plurality of monitoring servers after the allocation server parses a website monitoring request, which is transmitted from the terminal, for the websites to be monitored, and the monitoring information includes monitoring cycles and monitoring types.

The allocation unit 502 is used for allocating, according to a preset allocation algorithm, different monitoring execution times for the websites to be monitored;

The allocation unit further comprises a judgment module 5021, a first allocation module 5022 and a second allocation module 5023.

The judgment module 5021 is used for judging whether the websites to be monitored need to be synchronously monitored on the plurality of monitoring servers based on the monitoring types of the websites to be monitored, which correspond to the monitoring information received by the receiving unit 501.

The first allocation module 5022 is used for selecting, using a randomized algorithm, different times uniformly within the monitoring cycles as the monitoring execution times for the websites to be monitored, in response to a judgment result of the judgment module 5021 that there is no need to synchronously monitor each of the websites to be monitored on the plurality of monitoring servers.

The second allocation module 5023 is used for selecting, using a Hash algorithm, different fixed times within the monitoring cycles as the monitoring execution times for the websites to be monitored, in response to a judgment result of the judgment module 5021 that there is a need to synchronously monitor each of the websites to be monitored on the plurality of monitoring servers.

The determination unit 503 is used for determining priorities of the websites to be monitored based on lengths of the monitoring cycles.

The determination unit 503 further comprises a first determination module 5031, a second determination module 5032 and a third determination module 5033.

The first determination module 5031 is used for determining an order from high to low of the priorities of the websites to be monitored based on an order from short to long of the monitoring cycles, when the monitoring cycles of the websites to be monitored are not identical.

The second determination module 5032 is used for determining a tolerable delay time for each of the website to be monitored when the monitoring cycles of the websites to be monitored are identical.

The third determination module 5033 is used for determining the order from high to low of the priorities of the websites to be monitored based on an order from short to long of the tolerable delay times, which are determined by the second determination module 5032.

The calibration unit 504 is used for registering a timer to calibrate the monitoring execution times for the websites to be monitored.

It should be understood that the monitoring unit 505 performs monitoring on the websites to be monitored after the calibration unit 504 calibrates the monitoring execution times for the websites to be monitored.

The monitoring unit 505 is used for selecting, based on the priorities, a worker thread from a pre-created thread pool to allow the selected worker thread to periodically monitor the websites to be monitored at the monitoring execution times.

The monitoring unit 505 further comprises a counting module 5051 and a second selection module 5052.

The counting module 5051 is used for counting a number of websites currently monitored by each worker thread in the pre-created thread pool.

The second selection module 5052 is used for selecting, based on an order from high to low of the priorities, worker threads having a minimum number of websites currently monitored, which is counted by the counting module 5051, sequentially to allow the selected worker threads to periodically monitor the websites to be monitored at the monitoring execution times.

In some optional implementations of this embodiment, the monitoring unit 505 may further comprise the following modules which are not illustrated in FIG. 5:

an adding module which is used for adding the websites to be monitored to a predetermined buffering queue based on an order from high to low of the priorities;

a first selection module which is used for selecting the worker thread from the pre-created thread pool to allow the selected worker thread to sequentially select the websites to be monitored from the predetermined buffering queue for monitoring;

an adding stopping module which is used for stopping adding the websites to be monitored to the predetermined buffering queue, when the predetermined buffering queue is full;

a monitoring stopping unit 506 which is used for stopping monitoring a website specified by monitoring stop information in response to receiving the monitoring stop information from the allocation server, and the monitoring stop information is transmitted to the monitoring server when the allocation server receives the monitoring stop request which is transmitted from the terminal; and a result return unit 507 which is used for generating a monitoring result after the monitoring is stopped, and returning the monitoring result to the allocation server.

With the website monitoring device provided by the above embodiments of the present application, limited resources of the monitoring server are furthest utilized on the premise of ensuring that the monitoring result of the website to be monitored is correct, such that as many websites to be monitored as possible may be monitored and the usage efficiency of the resources is improved.

Figure 6:
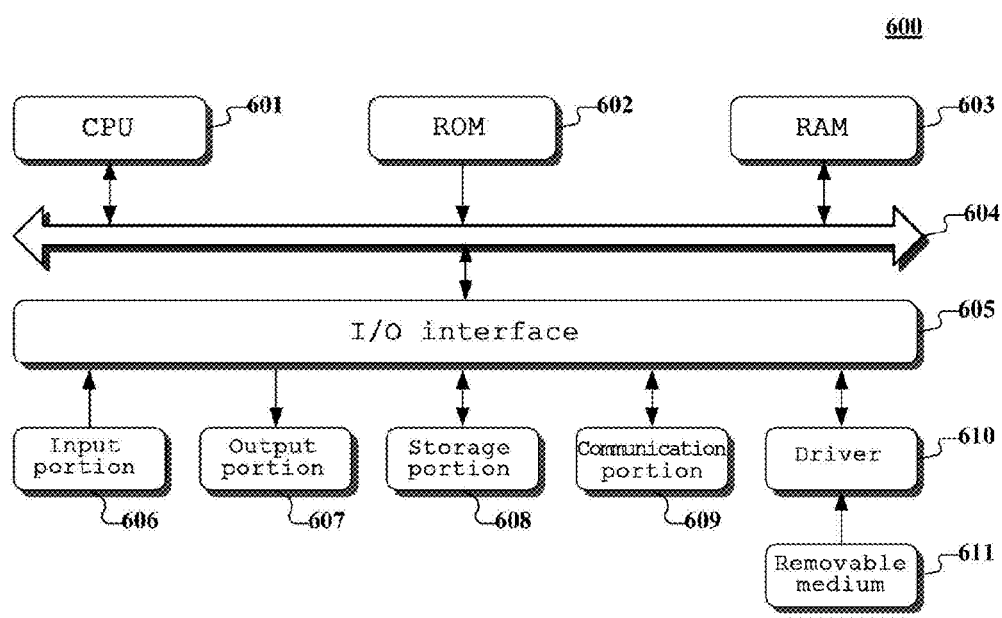
FIG. 6 is a schematic structural diagram of a computer system adapted to implement a monitoring server of the embodiments of the present application.

Referring to FIG. 6, a schematic structural diagram of a computer system 600 adapted to implement a terminal apparatus or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a receiving unit, an allocating unit, a determination unit and a monitoring unit, where the names of these units or modules are not considered as a limitation to the units or modules. For example, the receiving unit may also be described as "a unit for receiving monitoring information of websites to be monitored from the allocating server."

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to: receive monitoring information of websites to be monitored from the allocation server, the monitoring information transmitted to the plurality of monitoring servers after the allocation server parses a website monitoring request for the websites to be monitored transmitted from the terminal, and the monitoring information comprising monitoring cycles and monitoring types; allocate, according to a preset allocation algorithm, different monitoring execution times for the websites to be monitored; determine priorities of the websites to be monitored based on lengths of the monitoring cycles; and select, based on the priorities, a worker thread from a pre-created thread pool to allow the selected worker thread to periodically monitor the websites to be monitored at the monitoring execution times.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A website monitoring method, comprising:
   transmitting, by a terminal, a website monitoring request for websites to be monitored to an allocation server;
   parsing, by the allocation server, the website monitoring request transmitted from the terminal to obtain information corresponding to the website monitoring request;
   transmitting the parsed information to a plurality of monitoring servers;
   receiving, by the plurality of monitoring servers, monitoring information of the websites to be monitored from the allocation server, wherein the monitoring information is transmitted to the plurality of monitoring servers after the allocation server parses the website monitoring request for the websites to be monitored transmitted from the terminal, and the monitoring information comprises monitoring cycles and monitoring types;

allocating, according to a preset allocation algorithm, different monitoring execution times for the websites to be monitored;

determining priorities of the websites to be monitored based on lengths of the monitoring cycles; and selecting, based on the priorities, a worker thread from a pre-created thread pool to allow the selected worker thread to periodically monitor the websites to be monitored at the monitoring execution times.

2. The method according to claim 1, wherein the allocating, according to the preset allocation algorithm, different monitoring execution times for the websites to be monitored comprising:

judging whether the websites to be monitored need to be synchronously monitored on the plurality of monitoring servers based on the monitoring types of the websites to be monitored; and selecting, using a randomized algorithm, different times uniformly within the monitoring cycles as the monitoring execution times for the websites to be monitored, in response to no need to synchronously monitor each of the websites to be monitored on the plurality of monitoring servers.

3. The method according to claim 2, wherein the allocating, according to the preset allocation algorithm, different monitoring execution times for the websites to be monitored further comprising:

selecting, using a Hash algorithm, different fixed times within the monitoring cycles as the monitoring execution times for the websites to be monitored, in response to a need to synchronously monitor each of the websites to be monitored on the plurality of monitoring servers.

4. The method according to claim 1, wherein the determining the priorities of the websites to be monitored based on the lengths of the monitoring cycles comprises:

determining an order from high to low of the priorities of the websites to be monitored based on an order from short to long of the monitoring cycles, when the monitoring cycles of the websites to be monitored are not identical.

5. The method according to claim 4, wherein the determining the priorities of the websites to be monitored based on the lengths of the monitoring cycles comprising:

determining a tolerable delay time for each of the website to be monitored when the monitoring cycles of the websites to be monitored are identical; and determining the order from high to low of the priorities of the websites to be monitored based on an order from short to long of the tolerable delay times.

6. The method according to claim 1, wherein the selecting, based on the priorities, the worker thread from the pre-created thread pool to allow the selected worker thread to periodically monitor the websites to be monitored at the monitoring execution times comprises:

adding the websites to be monitored to a predetermined buffering queue based on an order from high to low of the priorities;

selecting the worker thread from the pre-created thread pool to allow the selected worker thread to sequentially select the websites to be monitored from the predetermined buffering queue for monitoring; and stopping adding the websites to be monitored to the predetermined buffering queue, when the predetermined buffering queue is full.

7. The method according to claim 1, wherein the selecting, based on the priorities, the worker thread from the pre-created thread pool to allow the selected worker thread to periodically monitor the websites to be monitored at the monitoring execution times comprises:

counting a number of websites currently monitored by each worker thread in the pre-created thread pool; and selecting, based on an order from high to low of the priorities, worker threads having a minimum number of websites currently monitored sequentially to allow the selected worker threads to periodically monitor the websites to be monitored at the monitoring execution times.

8. The method according to claim 1, wherein the method further comprises, prior to selecting, based on the priorities, the worker thread from the pre-created thread pool to allow the selected worker thread to periodically monitor the websites to be monitored at the monitoring execution times:

registering a timer to calibrate the monitoring execution times for the websites to be monitored.

9. The method according to claim 1, further comprising:

stopping monitoring a website specified by monitoring stop information in response to receiving the monitoring stop information from the allocation server, wherein the monitoring stop information is transmitted to the monitoring server when the allocation server receives the monitoring stop request transmitted from the terminal; and generating a monitoring result and returning the monitoring result to the allocation server.

10. A website monitoring device, wherein a terminal transmits a website monitoring request for websites to be monitored to an allocation server, and the allocation server parses the website monitoring request transmitted from the terminal to obtain information corresponding to the website monitoring request and transmits the parsed information to a plurality of monitoring servers, and the device comprises:

at least one processor; and a memory storing instructions; wherein the at least one processor is configured to read and execute the instructions to:

receive monitoring information of the websites to be monitored from the allocation server, wherein the monitoring information is transmitted to the plurality of monitoring servers after the allocation server parses the website monitoring request for the websites to be monitored transmitted from the terminal, and the monitoring information comprises monitoring cycles and monitoring types;

allocate, according to a preset allocation algorithm, different monitoring execution times for the websites to be monitored;

determine priorities of the websites to be monitored based on lengths of the monitoring cycles; and select, based on the priorities, a worker thread from a pre-created thread pool to allow the selected worker thread to periodically monitor the websites to be monitored at the monitoring execution times.

11. The device according to claim 10, wherein the at least one processor is further configured to read and execute the instructions to:

judge whether the websites to be monitored need to be synchronously monitored on the plurality of monitoring servers based on the monitoring types of the websites to be monitored; and select, using a randomized algorithm, different times uniformly within the monitoring cycles as the monitoring execution times for the websites to be monitored, in response to no need to synchronously monitor each of the websites to be monitored on the plurality of monitoring servers.

12. The device according to claim 11, wherein the at least one processor is further configured to read and execute the instructions to:

select, using a Hash algorithm, different fixed times within the monitoring cycles as the monitoring execution times for the websites to be monitored, in response to a need to synchronously monitor each of the websites to be monitored on the plurality of monitoring servers.

13. The device according to claim 10, wherein the at least one processor is further configured to read and execute the instructions to:

determine an order from high to low of the priorities of the websites to be monitored based on an order from short to long of the monitoring cycles, when the monitoring cycles of the websites to be monitored are not identical.

14. The device according to claim 13, wherein the at least one processor is further configured to read and execute the instructions to:

determine a tolerable delay time for each of the website to be monitored when the monitoring cycles of the websites to be monitored are identical; and determine the order from high to low of the priorities of the websites to be monitored based on an order from short to long of the tolerable delay times.

15. The device according to claim 10, wherein the at least one processor is further configured to read and execute the instructions to:

add the websites to be monitored to a predetermined buffering queue based on an order from high to low of the priorities;

select the worker thread from the pre-created thread pool to allow the selected worker thread to sequentially select the websites to be monitored from the predetermined buffering queue for monitoring; and stop adding the websites to be monitored to the predetermined buffering queue, when the predetermined buffering queue is full.

16. The device according to claim 10, wherein the at least one processor is further configured to read and execute the instructions to:

count a number of websites currently monitored by each worker thread in the pre-created thread pool; and select, based on an order from high to low of the priorities, worker threads having a minimum number of websites currently monitored sequentially to allow the selected worker threads to periodically monitor the websites to be monitored at the monitoring execution times.

17. The device according to claim 10, wherein the at least one processor is further configured to read and execute the instructions to:

register a timer to calibrate the monitoring execution times for the websites to be monitored prior to selecting, based on the priorities, the worker thread from the pre-created thread pool to allow the selected worker thread to periodically monitor the websites to be monitored at the monitoring execution times.

18. The device according to claim 10, wherein the at least one processor is further configured to read and execute the instructions to:

stop monitoring a website specified by monitoring stop information in response to receiving the monitoring stop information from the allocation server, wherein the monitoring stop information is transmitted to the monitoring server when the allocation server receives the monitoring stop request transmitted from the terminal; and generate a monitoring result and returning the monitoring result to the allocation server.

19. A non-transitory storage medium storing one or more programs, the one or more programs when executed by an apparatus, causing the apparatus to perform a website monitoring method, the website monitoring method comprising:

transmitting, by a terminal, a website monitoring request for websites to be monitored to an allocation server;

parsing, by the allocation server, the website monitoring request transmitted from the terminal to obtain information corresponding to the website monitoring request;

transmitting the parsed information to a plurality of monitoring servers;

receiving, by the plurality of monitoring servers, monitoring information of the websites to be monitored from the allocation server, wherein the monitoring information is transmitted to the plurality of monitoring servers after the allocation server parses the website monitoring request for the websites to be monitored transmitted from the terminal, and the monitoring information comprising monitoring cycles and monitoring types;

allocating, according to a preset allocation algorithm, different monitoring execution times for the websites to be monitored;

determining priorities of the websites to be monitored based on lengths of the monitoring cycles; and selecting, based on the priorities, a worker thread from a pre-created thread pool to allow the selected worker thread to periodically monitor the websites to be monitored at the monitoring execution times.

* * * * *